US007000183B1

(12) United States Patent
Crawford, Jr.

(10) Patent No.: US 7,000,183 B1
(45) Date of Patent: Feb. 14, 2006

(54) METHOD AND APPARATUS FOR VIEWER-SPECIFIC PRESENTATION OF INFORMATION

(75) Inventor: John M. Crawford, Jr., 27 School St., Brunswick, ME (US) 04011

(73) Assignee: John M. Crawford, Jr., Brunswick, ME (US)

( * ) Notice: Subject to any disclaimer, the term of this patent is extended or adjusted under 35 U.S.C. 154(b) by 908 days.

(21) Appl. No.: 09/671,431

(22) Filed: Sep. 27, 2000

Related U.S. Application Data

(60) Provisional application No. 60/156,344, filed on Sep. 27, 1999.

(51) Int. Cl.
G06F 13/00 (2006.01)
(52) U.S. Cl. .................. 715/530; 715/514; 715/515
(58) Field of Classification Search ............... 715/500, 715/500.1, 511, 514, 515, 517, 522, 530
See application file for complete search history.

(56) References Cited

U.S. PATENT DOCUMENTS

| | | | | |
|---|---|---|---|---|
| 5,812,865 | A * | 9/1998 | Theimer et al. | 709/228 |
| 5,860,073 | A * | 1/1999 | Ferrel et al. | 715/522 |
| 6,023,271 | A * | 2/2000 | Quaeler-Bock et al. | 345/866 |
| 6,119,101 | A * | 9/2000 | Peckover | 705/26 |
| 6,157,923 | A * | 12/2000 | Ivler et al. | 707/3 |
| 6,173,316 | B1 * | 1/2001 | De Boor et al. | 709/218 |
| 6,182,095 | B1 * | 1/2001 | Leymaster et al. | 715/515 |
| 6,192,377 | B1 * | 2/2001 | Ganesh et al. | 707/203 |
| 6,233,571 | B1 * | 5/2001 | Egger et al. | 707/2 |
| 6,240,422 | B1 * | 5/2001 | Atkins et al. | 707/102 |
| 6,327,609 | B1 * | 12/2001 | Ludewig et al. | 709/203 |
| 6,345,279 | B1 * | 2/2002 | Li et al. | 707/104.1 |
| 6,401,094 | B1 * | 6/2002 | Stemp et al. | 707/10 |
| 6,412,008 | B1 * | 6/2002 | Fields et al. | 709/228 |
| 6,421,675 | B1 * | 7/2002 | Ryan et al. | 707/100 |
| 6,499,023 | B1 * | 12/2002 | Dong et al. | 706/46 |
| 6,513,031 | B1 * | 1/2003 | Fries et al. | 707/3 |
| 6,516,349 | B1 * | 2/2003 | Lieberman | 709/225 |
| 6,519,571 | B1 * | 2/2003 | Guheen et al. | 705/14 |
| 6,609,128 | B1 * | 8/2003 | Underwood | 707/10 |
| 6,633,878 | B1 * | 10/2003 | Underwood | 707/100 |
| 6,697,824 | B1 * | 2/2004 | Bowman-Amuah | 709/229 |
| 6,718,535 | B1 * | 4/2004 | Underwood | 717/101 |
| 6,775,669 | B1 * | 8/2004 | Uesaka | 707/10 |

* cited by examiner

*Primary Examiner*—Stephen Hong
(74) *Attorney, Agent, or Firm*—Synnestvedt & Lechner LLP

(57) ABSTRACT

A computer-implemented method for viewer-specific presentation of information. The method includes a first step of receiving a request for information from a viewer. A viewer state associated with the viewer is then identified. The viewer state then provides a list of one or more data states in a ranked order of preference for satisfying a request for information for said viewer state. A data store contains data elements of a variety of data types, each data element tagged with a specific data type and data state. A collection of viewer-specific data elements is selected by searching the data store, and for each data type selecting the data element possessing the highest ranked data state specified by said ranked viewer states. The viewer-specific data elements are then presented to the viewer to satisfy the request for information. Accordingly, the present invention provides a method and apparatus for presenting to a viewer a viewer-specific subset of information. In one embodiment, the information is presented in a viewer-specific format. An apparatus for carrying out the inventive method is also provided.

17 Claims, 12 Drawing Sheets

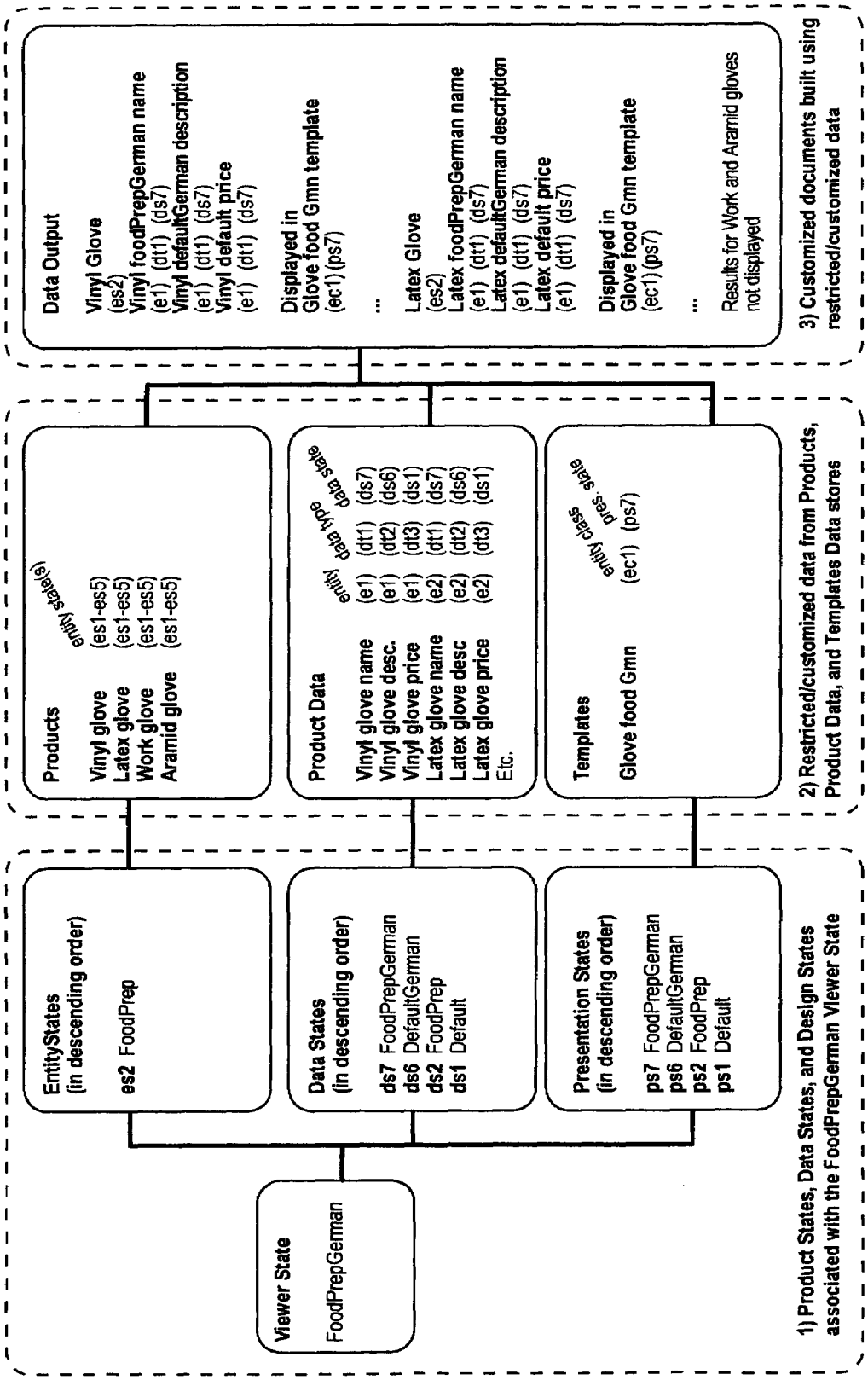

[/name]Nitrile gloves A109 series [/end]

*[/caption]*
*Super cool*
*gloves for you*
*[/end]*

[/description]We just love these gloves. They are our favorite gloves. We wear them to bed, to breakfast, to lunch, to dinner, and even during exams (they're impervious to biohazards!). Pick up a pair or two today.[/end]

| Prod.# | Color | Price |
|---|---|---|
| *[/beginTable]* *[/productNumber]* *A109.1[/end]* | *[/color]blue* *[/end]* | [/price] $12.95[/end] |
| Size: [/size]Medium[/end] | | [/endTable] |

[/note]Buy some today:[/end]  *([/productNumber]A109.1[/end])*

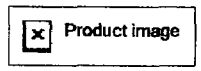  

---

Copyright ©2000 Firestar Systems Incorporated
All rights reserved

Figure 6

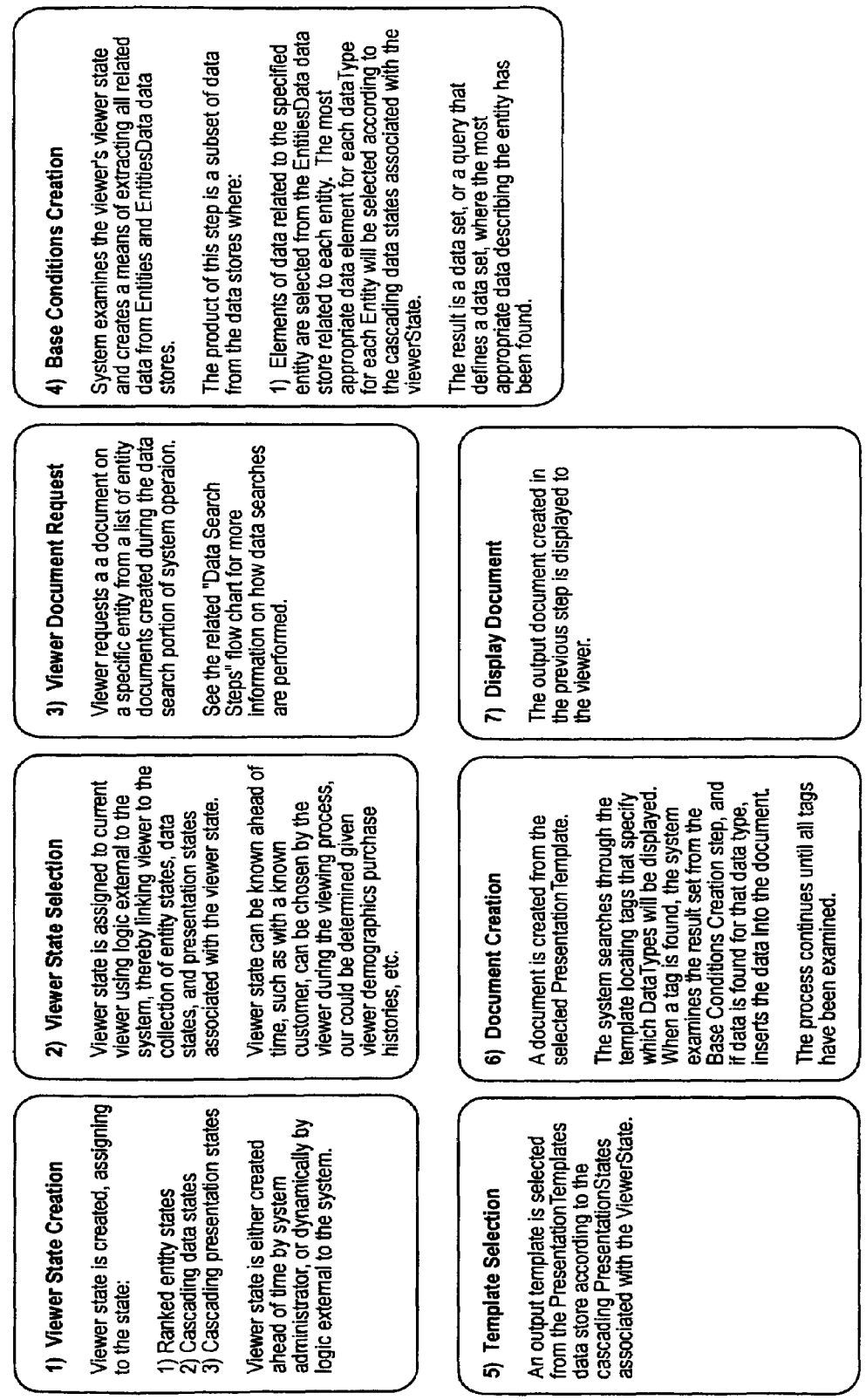

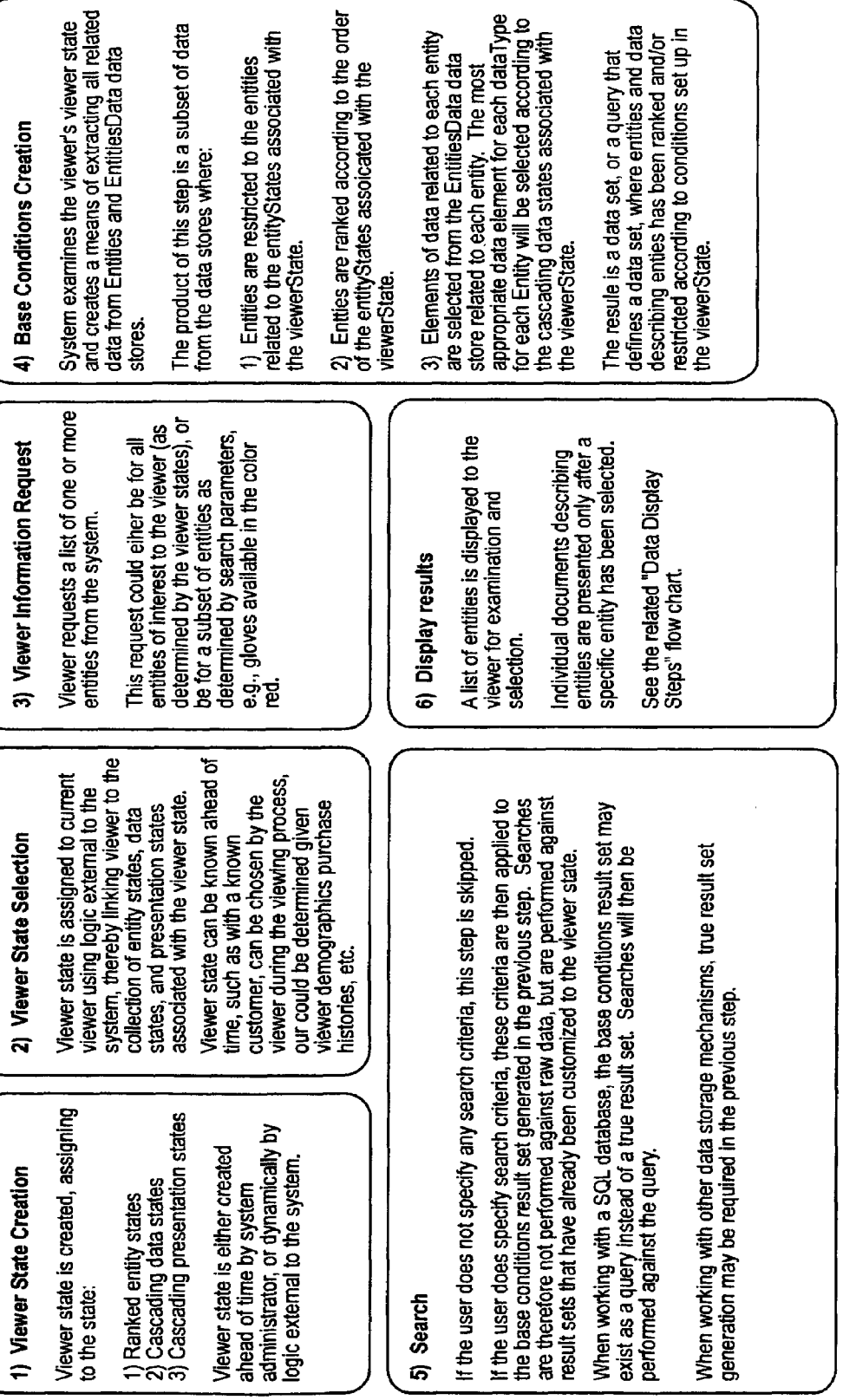

General vinyl food gloves

Great for most general purpose sanitary food handling work, these gloves are constructed from a sturdy 4 mil vinyl. Ideal for any situaiton that demands a fast-on fast-off disposable glove.

*Great all-purpose disposable glove*

| *Prod.#* | *Color* | *Price* |
|---|---|---|
| *112003* | *natural* | $7.60 |
|  |  | Size: Large |

Reversable ambidextrous gloves fit either right or left hands *(112003)*

 audio   video

Copyright ©2000 Firestar Systems Incorporated
All rights reserved

Figure 13

*Sehr guter universeller Einweghandschuh*

Universell eincusetzender Vinyl Handschuh

Dieser zweiteilige, beidseitig zu tragender, gemusterte fuselfreie Handshuh ist 9" lang. Strapazierfaehiger als Baumwolle, laeuft beim Waschen nicht ein. Mehrfacher Gebrauch. Handschuh wird meist in der Pharma- und Electro lindustrie eingesetzt.

| Art.-Nr. | Farbe | Preis |
|---|---|---|
| 112003 | natur | €7.79 |
| | | Groesse: Large |

Strapazierfaehiger als Baumwolle, laeuft beim Waschen nicht ein. Mehrfacher Gebrauch *(112003)*

 audio   video

Copyright ©2000 Firestar Systems Incorporated
All rights reserved

Figure 14

 Vinyl barrier gloves
*Great all-purpose disposable glove*

Useful for biohazard protection where tactile response is not essential, these gloves are constructed from a sturdy 4 mil vinyl. Ideal for any situation that demands a fast-on fast-off disposable glove.

| *Prod.#* | *Color* | *Price* |
|---|---|---|
| *112003* | *natural* | *$8.40* |
|  |  | Size: Large |

Reversible ambidextrous gloves fit either right or left hands *(112003)*

 audio   video

---

Copyright ©2000 Firestar Systems Incorporated
All rights reserved

Figure 15

METHOD AND APPARATUS FOR VIEWER-SPECIFIC PRESENTATION OF INFORMATION

RELATED APPLICATION

This application claims the benefit of U.S. Provisional Application No. 60/156,344, filed Sep. 27, 1999.

FIELD OF THE INVENTION

This invention relates generally to the field of information systems and particularly to a method and apparatus for presenting a viewer-specific subset of information in a viewer-specific format.

BACKGROUND OF THE INVENTION

Personalization of information increases the value of the information to an individual viewer. Information that is not specific to the role, motives, or needs of a viewer often proves to be of little use. However, that same information becomes more effective, persuasive, and informative once it is customized to the person viewing it. Because the needs of different viewers and viewer audiences vary so greatly, personalized information presentation is the most effective way to deal with multiple audiences, groups, markets, demographics, etc. This is particularly true for information aggregators or portals that present diverse data to broad groups of viewers. Each broad group will contain many sub groups, and each sub group will have different needs and interests compared to other sub groups. The capability to meet these varied needs by creating viewer-specific information is readily recognized as being vital to the future of the information industry.

The most effective viewer-specific information is that which has been completely customized in terms of both content and visual design. The more elements of each that are personalized to the viewer, the more effective the information will be. An optimum presentation will therefore have complete personalization of each content and formatting element.

Current information presentation systems do not provide complete customization of each content and visual design element. Current systems also have three additional shortcomings: 1) they are unable to function well with incomplete source data, 2) they must be restructured or reprogrammed when either source data or viewer audiences change significantly, and 3) they are inefficient in their use of personalization logic, and therefore their use of computer memory and processor bandwidth.

The ability to work with incomplete data is paramount. For large amounts of data, or for very complex data, it is either difficult or impossible to completely populate a database containing personalized information for every possible convolution of viewer audiences. Regardless of whether or not this data is available, complete database population is neither economic nor feasible in terms of time or money. The only way a large-scale complete personalization system (one that independently personalizes each content and formatting element) can work effectively is through management by exception, through presenting the best data available for each element. Current information systems cannot dynamically ascertain the best available data, regardless of data availability or lack thereof, for each content and formatting element. This makes current systems too complex and costly to function on a complete personalization level.

The ability to provide complete personalization without restructuring or reprogramming the system is vital. For a personalized information system to be cost effective and manageable, it must be able to handle not only standard data, but also any number of convolutions of personalized data. In any real world situation, both the standard and personalized data change continuously, as do the audiences they address. To have to restructure a database or reprogram a system every time there is a significant change in data or viewer needs would require prohibitive amounts of time, energy, and money. Current information presentation systems therefore cannot respond effectively to the changing needs of dynamic personalized information presentation.

The ability to provide complete personalization using minimal logic and processor bandwidth is also important. Any large-scale information presentation system that must serve hundreds or thousands of users needs to make efficient use of computer memory and processor bandwidth. Any system design that relies on extensive logic and program code for personalization will make significant demands on computer resources. To use such a design in a system serving thousands of simultaneous users will result in a system that is either too slow to be effective, or too expensive to be economical. Current personalization system designs require too much logic and processor bandwidth to provide complete dynamic personalization in large-scale systems.

The major purpose of this invention is to allow an information publisher to produce documents that have both information content and visual design customized to the information viewer. It is also the purpose of this invention to provide said information personalization while avoiding the shortcomings of current information presentation systems in the areas of: customization completeness, the ability to deal with incomplete data, the ability to adapt to change without restructuring or reprogramming, and the ability to function with a minimum of logic and processor bandwidth.

More specifically, it is the purpose of this invention to 1) use interrelated groups of meta information that describe relationships between information viewers, entities about which information is published, entity data, and document design templates, 2) use the interaction between these sets of data to select and rank entities, 3) select appropriate data on those entities, and 4) select appropriate design formats, to 5) present documents describing entities that have both content and format customized to the information viewer.

SUMMARY OF THE INVENTION

The present invention provides a method and apparatus for presenting to a viewer a viewer-specific subset of information in a viewer-specific format. Information is stored in one or more databases in a grouped and related manner which allows for selective presentation of information in selected formats. Predefined profiles are established so that when a viewer wishes to view information, the information is presented to the viewer in accordance with an appropriate profile. Metadata defining relationships between the viewer and/or the data allows search queries to be conducted on a viewer-customized, restricted subset of the information. The predefined profiles may also provide a hierarchy for ranked order of information presentation or for use to present information when the most preferred information is not available in a database. Metadata defining relationships between the view and/or design formats allows the viewer-customized, restricted subset of information to be presented in a viewer customized format or design. The predefined profiles may also provide a hierarchy for presentation formats for use to present information when the most preferred presentation format is not available in a database. The inventive method and system thereby provides for highly customized data presentation.

DESCRIPTION OF THE DRAWINGS

FIG. 5 is a block diagram depicting exemplary logic of document creation for the example of FIG. 1 in accordance with the present invention;

FIG. 6 is an exemplary presentation template in accordance with the present invention;

FIG. 11 is a flow diagram of exemplary data display steps in accordance with the present invention;

FIG. 12 is a flow diagram of exemplary data search steps in accordance with the present invention;

FIG. 13 is an exemplary document produced using the template of FIG. 6;

FIG. 14 is an exemplary document having data elements common to the exemplary document of FIG. 13, but using a customized template and different data elements suitable for a German viewer; and FIG. 15 is an exemplary document having data elements common to the exemplary document of FIG. 13, but using a customized template and different data elements suitable for the health care industry.

DETAILED DESCRIPTION

Figure 1:
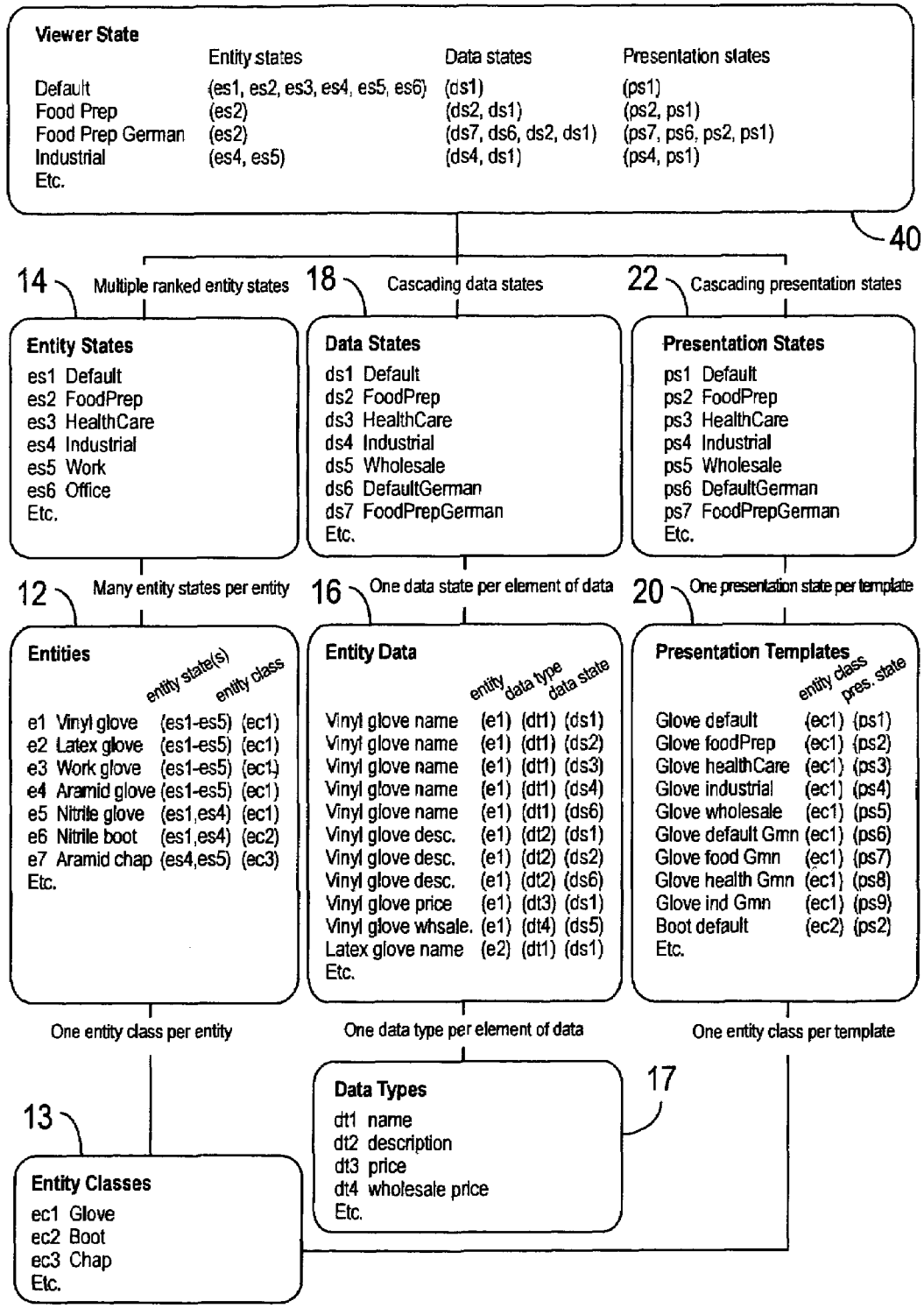
FIG. 1 is a block diagram depicting exemplary data stores in accordance with the present invention.

The present invention provides a method and apparatus for presenting to a viewer a viewer-specific subset of information in a viewer-specific format. In other words, information is stored in a database or multiple databases in a grouped and related manner which allows for selective presentation of information in selected formats. Stored data includes templates for presenting the information. Predefined viewer profiles (viewer states) are established so that when a viewer wishes to view information, the information is presented to the viewer in accordance with an appropriate viewer state. Metadata defining relationships between the viewer and/or the data allows search queries to be conducted on a viewer customized, restricted subset of the information. For example, the profile indicates which classes of information a viewer will receive, e.g., a class of products relating to the food service industry, which data elements the viewer will receive, e.g., German language content relating to certain food preparation products, and which format template will be used to present the data, e.g., a specific HTML coded web page template. The predefined profiles may also provide a hierarchy for ranked order of information presentation or for use to present information when the most preferred information is not available, e.g., when the database is not populated with German language content, English language content may be provided.

The inventive method and system thereby provides opportunities to highly customize data presentation for diverse viewers, allows for presentation of information for an incomplete database, and allows for rapid entry into new markets, e.g., Australian health care, or new information presentation platforms, e.g., wireless Web, with only minimal additions and/or revisions to the system.

The present invention uses one or more data stores containing data relating to entities, entity information, and presentation templates and one or more data stores containing metadata defining viewer states, entity states, data states, and presentation states. For example, each data store may be a traditional row-and-column database, an object database, a text base, or any other suitable type of data store. By relating the data stored in these data stores, the present invention allows for production of documents and/or information presentations (collectively "presentations") that have both content and format customized to the information viewer.

For an overview of how the invention operates, see FIG. 5 (later described in more detail). A viewer is assigned a Viewer State defining metadata regarding which Entity States, Data States, and Presentation States are most appropriate to the viewer. The list of Entity States ranks and restricts the entities about which the viewer can obtain information, e.g., a viewer in the food preparation industry will view only products related to that industry, and if looking at a list of products, will see the most appropriate products first. The list of Data States defines which elements of data describing the selected entities will be presented to the viewer, e.g., the food preparation viewer will be shown data specific to the food preparation industry when available. The list of Presentation States defines which visual formats or designs will be used to present the selected data elements on the selected entities, e.g., the invention will use a visual format specific to the food preparation industry, when available, to display the selected industry-specific data on the selected industry-specific products. The end result is a system that displays information where both the information content and format are customized to the Viewer State according to the Entity States, Data States, and Presentation States associated with the Viewer State.

FIG. 1 is a block diagram 10 depicting relationships among various data stores in accordance with the present invention. FIG. 1 shows an Entities data store 12. The Entities data store 12 contains a record, i.e., entry, for each entity to be described by the system. In the example of FIG. 1, the system stores entity data relating to industrial apparel products, including gloves, boots, and chaps. In this example, an EntityClasses data store 13 stores a record for each class of apparel products, e.g., gloves, boots, and chaps, each having a unique entity class identification key ("entity class ID"), e.g., ec1 for gloves.

Figure 2:
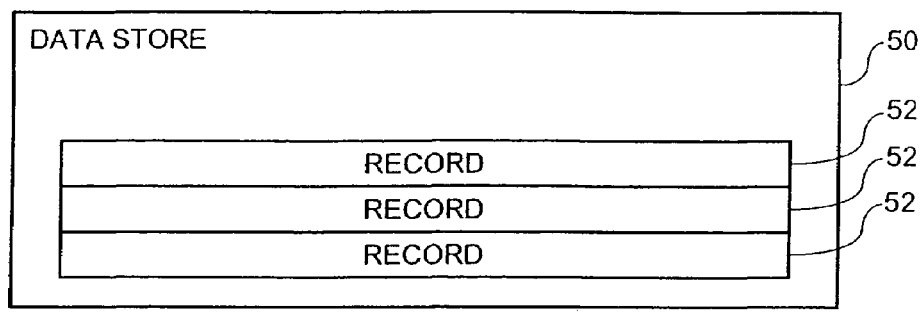
FIG. 2 is a logic diagram of a data store in accordance with the present invention.

FIG. 2 is a logic diagram of an exemplary data store 50 in accordance with the present invention. For example, the exemplary data store 50 could be stored on a hard disk drive or CD-ROM and is capable of storing a plurality of records 52, as is well-known in the art.

Figure 3:
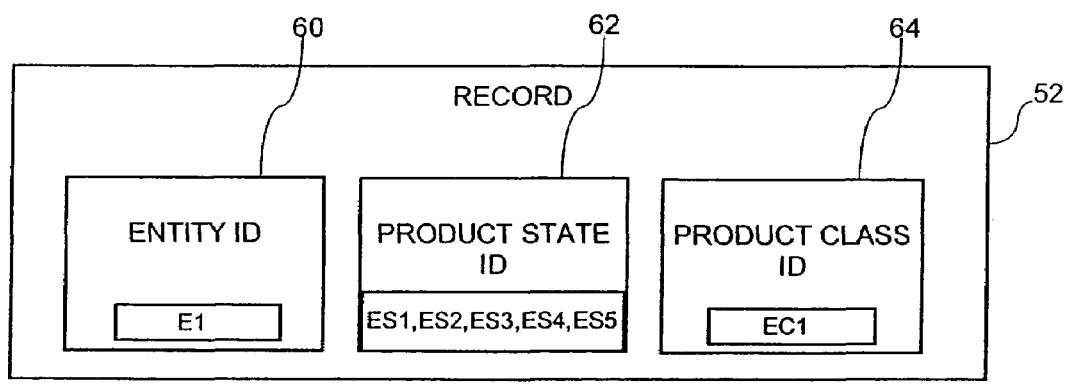
FIG. 3 is a logic diagram of an exemplary storage of data in a data store in accordance with FIG. 2 in accordance with one embodiment of the present invention.

Each record in the Entities data store 12 includes a corresponding entity class ID, e.g., ec1 stored in association with a unique entity identification key ("entity ID"), e.g., e1. Each record also includes a list or collection of unique entity state identification keys ("entity state ID's"), e.g. es1, that correspond to one or more entity states from the EntityStates data store 14. In other words, each record in the Entities data store includes fields for storing an entity ID, entity state ID and an entity class ID. FIG. 3 is a logic diagram of an exemplary storage of data in a record 52 of a data store 50 in accordance with one embodiment of the present invention. As shown in FIG. 3, the record 52 includes fields, 60, 62, 64 for storing an entity ID, entity state ID, and entity class ID. For example, the Entities data store 12 stores a record for a vinyl glove. The record includes an entity ID of e1, a collection of entity state ID's including es1, es2, es3, es4 and es5, and an entity class ID of ec1. Accordingly, the Entities data store contains data about relationships between other data elements. In this manner, many entities and entity data elements can be grouped by relatively few entity states.

FIG. 1 also shows a EntityData data store 16. The EntityData data store 16 contains a record for data elements for the various entities. In the example of FIG. 1, the system stores data elements relating to the gloves, boots, and chaps products, e.g., a name, a description, and price for the vinyl glove, etc. Each record in the EntityData data store 16 includes a data element and a corresponding entity ID which associates it with an entity from the Entities data store 12, e.g., e1. In this example, a DataTypes data store 17 stores a record for each type of data element, e.g., name, description, price, etc., each having a unique data type identification key ("data type ID"), e.g., dt1 for name. Each record in the EntityData data store 16 is also associated with a data type ID, e.g., dt1. Each record in the EntityData data store 16 is further associated with a data state identification code ("data state ID") that corresponds to a data state from the DataStates data store 18. In other words, each record in the EntityData data store 16 includes fields for storing an entity data element, entity ID, data type ID, and data state ID. In the example of FIG. 1, the EntityData data store 16 stores several records for the vinyl glove. For example, "Vinyl glove name" is the data element for the vinyl glove, the associated entity ID is e1, the associated data type is dt1, and the associated data state is ds1.

Figure 4:
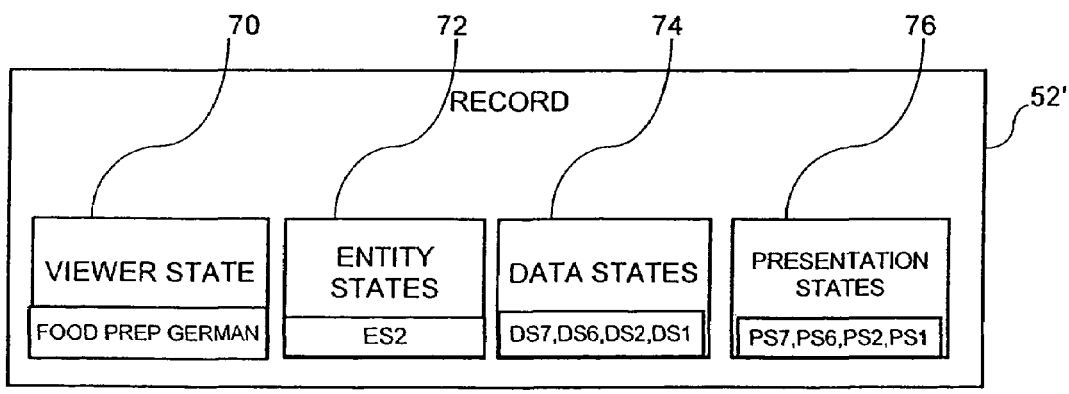
FIG. 4 is a logic diagram of an exemplary storage of data in a data store in accordance with FIG. 2 in accordance with one embodiment of the present invention.

FIG. 1 also shows a PresentationTemplates data store 20. The PresentationTemplates data store 20 contains multiple presentation design templates. Each template is a text or binary file constructed to have a distinct layout and to have all necessary data and/or programming code to present the information in a specific medium, such as Web (html, xml), wireless (wml), print, etc. The actual format will depend upon the design of the template, e.g., title at top or bottom or page, in bold or non-bold type, with or without certain graphics layouts, etc. Each template can be as small as a single phrase, line, or subdocument in a larger document, or can be an independent standalone document. A separate template can be designed for use to appeal to each class of viewers, e.g., one for retail customers, one for wholesale customers, one for health care industry customers, one for food preparation industry customers, etc. FIG. 4 is a logic diagram of an exemplary storage of data in an alternate record 52' of a data store 50 in accordance with one embodiment of the present invention. As shown in FIG. 4, the record 52' includes fields, 70, 72, 74, 76 for storing a viewer state, a list of corresponding entity states, a list of corresponding data states, and a list of corresponding presentation states, respectively. An exemplary template including HTML code for presenting data in a Web-based format is shown in FIG. 6.

In the example of FIG. 1, the system stores presentation template data relating to the gloves, boots, and chaps products. For example, the various templates are designed for presenting glove information to the food preparation industry, health care industry, etc. Each template in the PresentationTemplate data store 20 is associated with an entity class ID and a unique presentation state identification key, presentation state ID. In other words, each record in the PresentationTemplate data store 20 includes fields for storing presentation template data, an entity class ID, and a presentation state ID. In the example of FIG. 1, the PresentationTemplate data store 20 stores several templates for use to display glove-related information, e.g., information relating to entity class ec1. Accordingly, the "Glove default" presentation template could be used to present glove data.

Various state data stores are compiled and stored to define metadata, i.e., data defining relationships of the data stored in the Entities, Entity Data and Presentation Templates data stores. These states are defined using logic external to the system, e.g., marketing strategy.

An EntityStates data store 14 is shown in FIG. 1. The EntityStates data store 14 contains a record for each category of entities to be described by the system. Categories are defined as groups of entities in which an information viewer may be interested. In the example of FIG. 1, the EntityStates data store includes Default, FoodPrep, HealthCare, Industrial, Work and Office categories. For example, the FoodPrep entity state is suitable for an information viewer in the food preparation industry.

Each record in the EntityStates data store 14 includes a unique entity state identification key EntityStateID, e.g., es1. Each entity in the Entities data store is related by a many-to-many relationship to one or more entity states in the EntityStates data store. Accordingly, each entity state is associated with a certain subset of entities. For example, the Default entity state is associated with the vinyl, latex, work, Kevlar® brand para-aramid fiber material and Nitrile gloves while the FoodPrep entity state is associated with only the vinyl, latex, work and Kevlar® brand para-aramid fiber material gloves because a Nitrile glove would be unsuitable for use in the food preparation industry.

A DataStates data store 18 is shown in FIG. 1. The DataStates data store 18 contains a record for each class of users to be serviced by the system. In the example of FIG. 1, the DataStates data store includes Default, FoodPrep, HealthCare, Industrial, Wholesale, DefaultGerman, FoodPrepGerman, HealthCareGerman, IndustrialGerman and WholesaleGerman classes. For example, the FoodPrepGerman data state is suitable for an information viewer in the food preparation industry that wishes to receive information in the German language, where possible.

Each record in the DataStates data store 18 includes a unique data state identification key DataStateID, e.g., ds1. Each entry in the DataStates data store 18 is related by a one-to-many relationship to one or more entries in the EntityData data store 16 by the DataState ID. Accordingly, each data state is associated with a certain subset of entity data elements. For example, the Default data state is associated with a certain vinyl glove name, a certain vinyl glove description and a certain vinyl glove price.

A PresentationStates data store 22 is shown in FIG. 1. The PresentationStates data store 22 contains a record for each class of presentation viewers to be supported by the system. In the example of FIG. 1, the PresentationStates data store includes Default, FoodPrep, HealthCare, Industrial, Wholesale, DefaultGerman, FoodPrepGerman, HealthCareGerman, IndustrialGerman and WholesaleGerman classes. For example, the FoodPrepGerman presentation state is suitable for an information viewer in the food preparation industry.

Each record in the PresentationStates data store 22 includes a unique presentation state identification key presentation state ID, e.g., ps1. Each presentation state in the PresentationStates data store is related to one or more presentation templates in the PresentationTemplates data store 20 using the presentation state ID. Accordingly, each presentation state is associated with a certain subset of presentation template data.

In accordance with the present invention, viewer states defining viewer profiles are defined and stored in a ViewerStates data store, as shown at 40 in FIG. 1. In other words, the ViewerStates data store stored metadata defining relationships between viewer states and metadata in the EntityStates, DataStates and PresentationStates data stores. Each viewer state includes hierarchies of classes of information. An individual viewer may be assigned a viewer state by any suitable method, typically involving marketing strategy and/or judgment as to the type and/or format of information the viewer is most likely to want to receive. Accordingly, this ViewerState data store contains the information needed for viewer-specific customization.

Each record in the ViewerStates data store 40 stores information relating to a viewer state, e.g., Industrial, and corresponding hierarchies of EntityStates, DataStates, and PresentationStates. The EntityStates are hierarchical in that they rank one or more entity states in order of preference. The states are supplemental, and not alternative. Because fewer than all entity states may be listed, this list restricts the entity data to produce a selected subset of data, e.g., entities associated with other entity states will not be presented to the viewer. For example, for the Industrial viewer state, an entity state of e4 (Industrial) is most preferred and an entity state of e5 (Work) is second most preferred. Because these entity states are supplemental, all information relating to entity states e4 and e5 will be presented to the user. However, the information relating to entity state e4 will be given preferential treatment, i.e., presented to the user before information relating to entity state e5. In this manner, an Industrial viewer will receive information coded as Industrial first, since this information is most likely most relevant, and then information coded as Work generally, since this information may also be relevant but probably not as relevant as information coded as Industrial.

The DataStates and PresentationStates are cascading. In other words, they are alternatives arranged in a hierarchical fashion. For example, for the FoodPrepGerman viewer state, the presentation state hierarchy is ps7, ps6, ps2, and ps1. In this example, ps7 is most highly preferred and ps1 is least preferred. Other presentation states will not be used. Accordingly, information will be presented to a user using ps7, if the PresentationTemplates data store is populated with a template coded with a presentation state ID of ps7, ps6 if ps7 is not available, ps2 if ps6 is not available, and ps1 if ps2 is not available. This allows a viewer's request for information to be serviced before a database is complete. For example, during construction, the database could be first populated with ps1 information. Later the database could be supplemented to add ps2, then ps6 then ps7, providing further system development but providing operability during the development time, which for many databases spans the life of the database.

In operation, an information viewer first makes a request, or prepares to make a request. For example, the information viewer may log on to the computer system using a suitable technique well known in the art. At this point, a viewer class is determined, e.g., by reading a suitable cookie stored on the viewer's client computer, by receiving input of viewer state information from the viewer, etc.

After identifying a viewer state corresponding to the viewer, the system identifies corresponding entity state and data state information by reference to the ViewerState data store 40. The system then compares the Entity States described in the viewer's Viewer State, and then selects, restricts, and/or ranks related Entities accordingly. The system then compares the Data States described in the Viewer States, and then selects the most appropriate data elements from the Entities Data data store that relate to the selected entities, selecting no more than one data element of each Data Type for each entity. In essence, the entire database of entities and entity data is restricted, prior to the user's query, to produce a subset of information which will be used for the viewer's query. This is achieved by searching, in response to a query, only among the entities and entity data that correspond to the entity state and data state information provided in association with the viewer's viewer state. This allows the viewer to conduct queries on data that has already been customized to the viewer. For example, a viewer assigned a FoodPrep Viewer State will search only through subsets of Entities and Entity Data that are most suited to the food preparation industry. Additionally, it removes the possibility of returning to the viewer information not intended for the viewer's eyes, e.g., a wholesale price when the viewer is a retail buyer. For example, a viewer assigned a FoodPrep viewer state will have his search request performed by searching only through entities in the Entities data store 12 associated with entity state es2, namely, the vinyl, latex, work and Kevlar® brand para-aramid fiber material gloves, i.e., entities with an entityID of e1, e2, e3 or e4.

Additionally, the search request will be performed by searching through the entity data information in the EntityData data store 16 associated with entities with an entityID of e1, e2, e3 or e4. Each data element in the EntityData data store 16 has an associated data type, e.g., dt1, and multiple data elements may exist for each data type, for each entity.

The FoodPrep viewer state is associated with a cascading list of data states, e.g., ds2 and ds1. For each entity having an entityID of e1–e4, a data element in the EntityData data store 16 is selected for each data type, e.g., dt1, dt2, dt3 and dt4. The viewer-specific data element is determined in accordance with the hierarchy of cascading data states. Accordingly, for each data type, the data element having a data state of ds2 is used unless no such data element is stored in the EntityData data store 16, at which time a data element having a data state of ds1 is used. Accordingly, if the viewer searches for a vinyl glove named VIN-X, the system will only search among the viewer-specific data elements in the EntityData data store 16 corresponding to a) the viewer-specific entities in the Entities data store 12, as set forth by in the entity states specified in the ViewerState data store 40, and b) the viewer-specific data in the Entity Data data store 16, as set forth by the data state specified in the ViewerState data store 40. As a practical matter, this may require the execution or one or more database queries.

Finally, the system selects an appropriate presentation template from the PresentationTemplate data store 20. The presentation template is selected for each entity class ID, e.g., ec1, in accordance with the cascading list of presentation states set forth in the ViewerState data store 40 in association with the viewer's assigned viewer state. For example, for entities having an entity class ID of ec1 (gloves), a viewer assigned a viewer state of FoodPrepGerman will be presented information using a presentation corresponding to presentation state ps7 if available, ps6 if ps7 is not available, ps2 if ps6 is not available, and ps1 if ps2 is not available. In the example, ps7 is available and would be used for presenting data relating to gloves to such a viewer.

The end result is a collection of one or more information presentations, each of which has been selected, restricted, and ranked based upon the information viewer. Each document in this collection has both its content and its format customized to the information viewer. This customization of content and format represent a marked increase in the utility and effectiveness of the information presented.

FIG. 5 is a block diagram depicting exemplary logic of document creation for the example of FIG. 1, namely for the FoodPrepGerman viewer state. FIG. 5 shows the data selected by the invention from each data store according to data relationships and source data depicted in FIG. 1. FIG. 5 does not show actual data presentation in corresponding presentation templates, but rather shows the information that is to be presented in a suitable template.

In review, FIG. 5 illustrates the following process: a) the viewer state FoodPrepGerman is selected, signifying a viewer in the food preparation industry in Germany; b) the FoodPrepGerman viewer state specifies entities with the FoodPrep entity state es2; c) the FoodPrepGerman viewer state specifies data states of FoodPrepGerman if available, if not, then DefaultGerman if available, if not then FoodPrep if available, if not then Default, cascading from ds7 to ds6 to ds2 to ds1; d) the FoodPrepGerman viewer state specifies presentation states of FoodPrepGerman if available, if not, then DefaultGerman if available, if not then FoodPrep if available, if not then Default, cascading from ps7 to ps6 to ps2 to ps1; e) the specified entity states select the products Vinyl glove, Latex glove, Work glove, and Kevlar® brand para-aramid fiber material glove, all which include entity state es2; f) the specified data states select one name, description, and price for each glove, choosing the data element for each that has the highest-ranking data state as defined by the cascading list ds7 to ds6 to ds2 to ds1; g) the specified presentation states select the Glove food Gmn presentation template because it possesses the highest-ranking presentation state as defined by the cascading list ps7 to ps6 to ps2 to ps1; h) output documents are created for each selected entity, displaying each selected data element, in the format of the selected presentation template. The resultant output consists of documents describing products related to the German food preparation industry, with data most appropriate to that industry, using presentation formats most appropriate to that industry.

The methods used by this invention render it superior to prior art in a number of ways:

1) The means of storing data elements as tagged rows in a data store enables new data types and data states to be added to the system at any time without changing the structure or schema of the data stores. Existing systems use methods of data storage that require restructuring of data stores to accommodate changes in data types or data states. Such a design is neither practical nor efficient when publishing customized information presentation where viewer roles or source data change on a regular basis. This invention is therefore more flexible and more adaptable to change than prior art, allowing information publishers to switch to new viewer roles markets or new products with simply the addition of a few new presentation templates or data elements. For example, a traditional system may have to be restructured when servicing a new industry, such adding the plumbing industry to the list of food preparation, health care, and industrial industries, or storing data on new types of entities, such as adding wrenches and pipes to an existing list of gloves and boots to. This invention could accommodate such changes without any changes to its basic design.

2) The means of storing data elements as tagged rows in a data store enables unlimited numbers of data types and data states to be added to the system. Existing systems using row-and-column databases face practical limits of the number of fields of information that can be stored. A combination of 40 different data types, with data states accommodating 10 industries in 5 languages would require 2000 unique fields of information, a collection of fields significantly greater than the limit of 255 fields or 1024 fields inherent in many databases. This invention simply adds more data types and data states as required, provided that there is enough storage space to hold all the information. This enables a company using this invention to change and add viewer roles and data types at any time, knowing that future change will not create an insurmountable obstacle brought on by system architecture.

3) The means of storing data elements as tagged rows in a data store enables relevant data elements to be selected by a highly efficient database query without running data selection logic in the form of program code. Existing systems use storage methods that fix the use of each data element as a single named field of information. This fixation means that a simple query cannot be used to select the most appropriate data element for any given data type. Instead, program code must be executed to properly select each data type for each entity. For a system searching 10,000 rows of data (entities) with 40 data types, this would require executing a complex function 400,000 times, an amount of overhead that can render large-scale information systems ineffective. Since this invention does not require running such complex functions, data element selection happens quickly in queries at the database server level, and no such overhead is incurred. When used for complete personalization, this allows someone using the invention to utilize much less powerful (and therefore less costly) computer hardware to run the system, to service more simultaneous users or more complex data with the same hardware, or to service combinations of large numbers of simultaneous users and complex data that would not be possible with traditional systems.

4) The means of using cascading data states enables the invention to function with incomplete data, returning the most appropriate data elements and most appropriate presentation formats available in the data stores. Existing systems cannot adapt well to incomplete data, and therefore run into problems when presented with data stores that are not fully populated with each convolution of data types and data states. Since it is neither practical nor economically feasible to completely populate large scale databases with data for every combination of data type and data state, existing systems face significant shortcomings when used to present viewer-specific information. On the other hand, once default data is present, this invention functions well with any additional amount of data, allowing the invention to be used as databases become more completely populated, and as new viewer roles and data arise, thereby creating new states of data incompleteness. For example, this invention would become operable simply with default data and one presentation template for each viewer state such as food preparation, health care, and industrial, even though other viewer-specific data has not yet been entered. The system will simply grow more effective as the database becomes more completely populated. This allows a company using the system to quickly get a project off the ground quickly with a minimum of data, and then later invest time and effort into further data population as dictated by business requirements.

5) The means of using cascading presentation states enables the invention to function with incomplete collections of presentation templates, returning the most appropriate presentation format available in the data store. As with incomplete content, existing systems do not adapt well to incomplete collections of presentation formats. The cascading presentation states also confer the benefit of moving into different output media simply by adding new media-specific output templates to the PresentationTemplates data store. This would allow someone using the system to move from Internet and Print output to wireless device output while using existing entity data simply by adding a set of wireless device output templates. Likewise, new markets and viewer roles can be serviced using existing entity data simply by adding new presentation templates.

6) The means of tagging each element of data with both a data type and a single data state from a series of cascading data states enables every single content element in an output documents to be customized to the viewer role. Because of structural and logic limitations of existing systems, they are not used to present complete content customization. This invention is therefore more appropriate any time complete content customization is desired. For example, while an existing system might be able to customize a product description to a viewer role, this invention could customize the product name, description, price, caption, pictures, video, etc. to each viewer role, providing a much more effective presentation.

7) The means of tagging each presentation template with a single data state from a series of cascading presentation states enables every single presentation format template used to create output documents to be customized to the viewer role. The same structural and logic limitations of existing systems with respect to complete content customization apply to complete presentation format customization as well. For example, this would allow a company to present data with an "edgy" design to young investors fitting a youthful viewer state profile, while the same basic information could be presented with a conservative layout and graphics for viewers fitting a more conservative investor profile.

In general, the present invention always provides the best information available, with the best presentation format available as determined by the system. The same viewer may request the same information, but get more highly customized results as the database grows to include customized information. Different viewers may request the same information, but get more highly customized results as the database grows to include more customized. This can be done by simply storing additional information in the database, without significant changes to the overall database structure or system software. Complete customization changes to viewer roles, types of data stored, markets served, etc., can all be accomplished by changing information in the database, and therefore do not present the same problems to this invention that they do to traditional systems.

This invention, therefore, accomplishes its goals of surpassing prior art by providing complete content and visual design customization, adapting well to incomplete data, adapting well to changes in viewer roles and data types without restructuring or reprogramming, and functioning with a minimum of logic and processor bandwidth.

Figure 10:
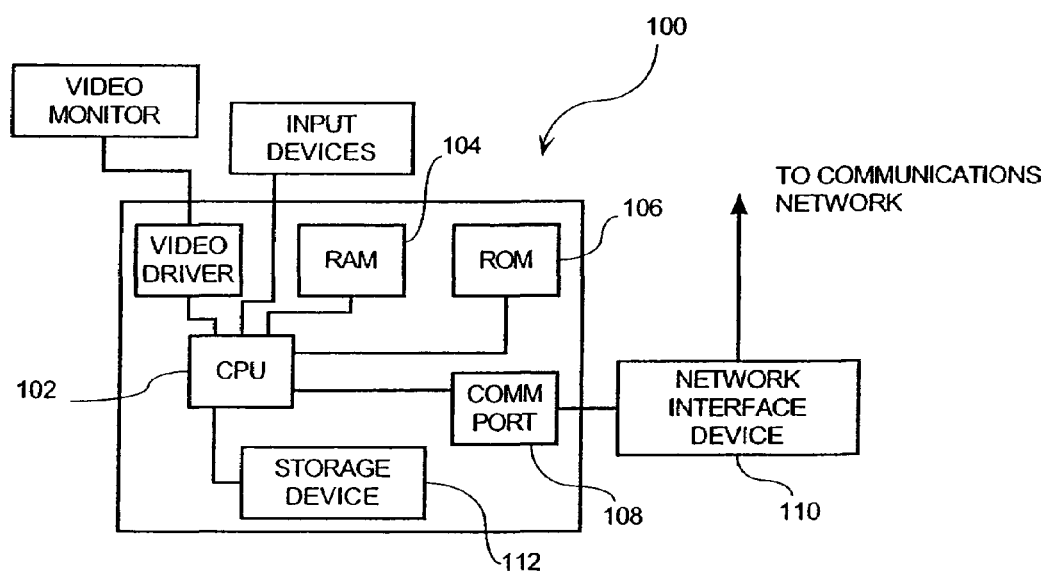
FIG. 10 is a block diagram of an exemplary information server 100 in accordance with the present invention.

FIG. 10 is a block diagram of an exemplary information server 100 in accordance with the present invention. The hardware of the information server is of a type generally known in the art. The information server includes a central processing unit ("CPU") 102, random access memory ("RAM") 104, read only memory ("ROM") 106, and a communications port ("COMM PORT") 108 connected to a network interface device 110 for communicating over a communications network. The information server 100 also includes a storage memory including a storage device 112 for storing data including programs for carrying out the inventive method.

Figure 7:
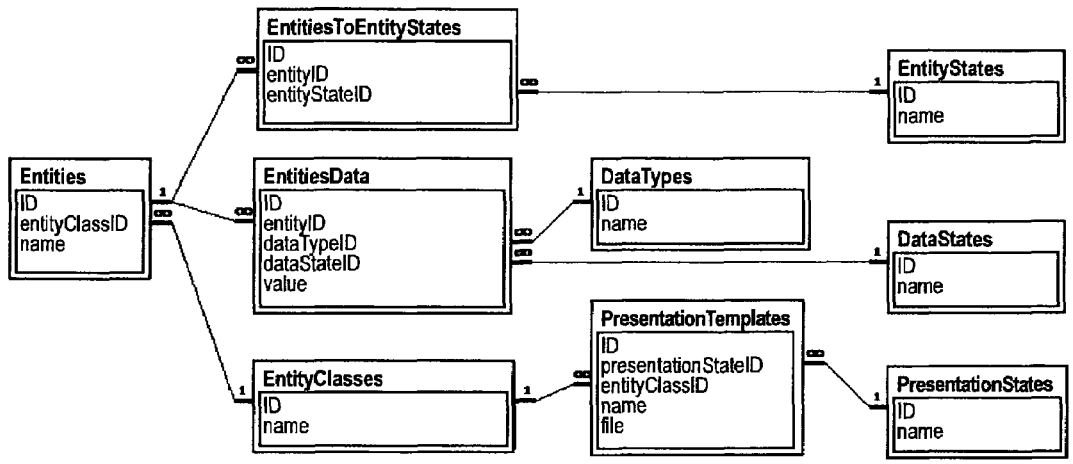
FIG. 7 is an exemplary block diagram depicting relationships between system data stores when implemented using an SQL database in accordance with the present invention.
Figure 8:
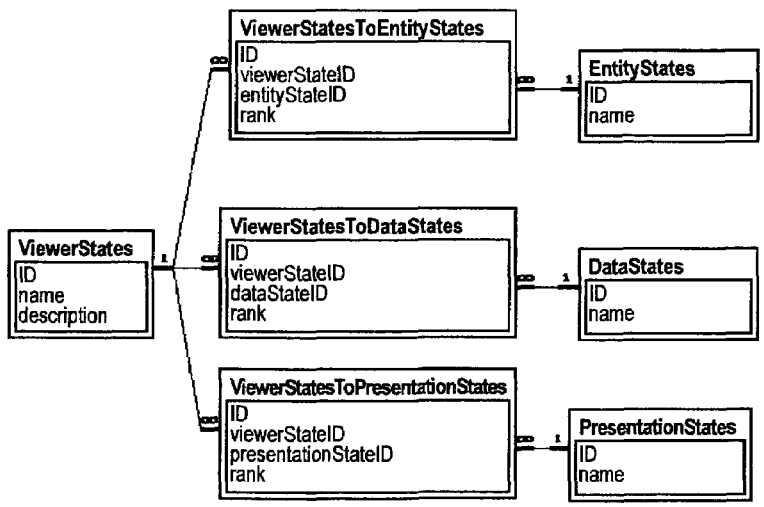
FIG. 8 is an exemplary block diagram depicting relationships between system data stores when implemented using an SQL database in accordance with the present invention.
Figure 9:
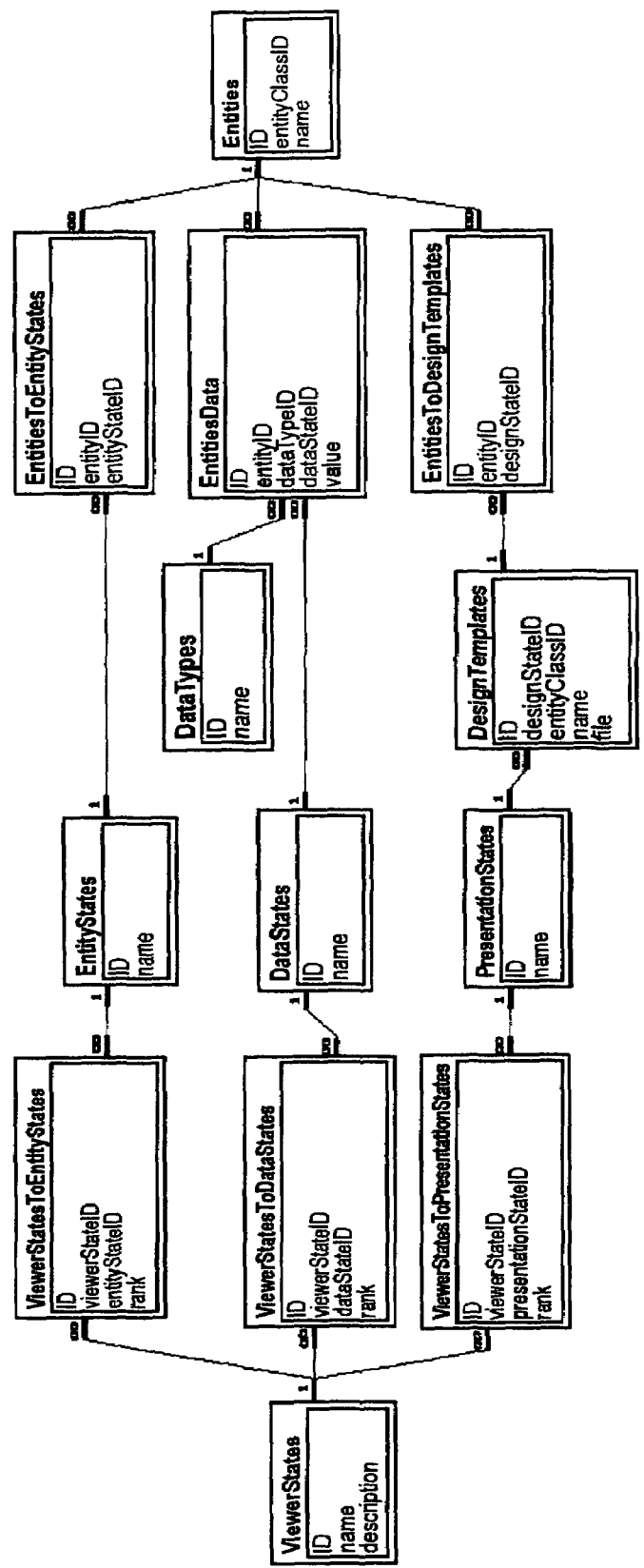
FIG. 9 is an exemplary block diagram depicting relationships between system data stores when implemented using an SQL database in accordance with the present invention.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. For example, the entity states in the viewer states data store could be cascading instead of supplemental. For example, the invention could be implemented using a structured query language (SQL) or object database. In such an embodiment, additional data stores (object classes, SQL database tables, etc.) are created for EntitiesToEntityStates and EntitiesToPresentationStates to model many-to-many relationships. An example of these data stores and relationships is shown in FIG. 7. For example, in the EntitiesToEntityStates data store, a record is added for each entity-to-entityState relationship, with this record containing the entityID of an entity and the entityStateID of the corresponding entity state. In an object database this will require the relationship to be modeled by adding an entityStates field to each entity object, said field containing a collection of entityStateID's instead of a single value. Additionally, each entry in the PresentationStates data store is related to one or more entries in the PresentationTemplates data store using an intermediary table such as PresentationStatesToPresentationTemplates in which a record is added for PresentationState-to-PresentationTemplate relationship, with this record containing the PresentationStateID of a PresentationState and the PresentationTemplateID of a PresentationTemplate. In an object database this will require the relationship to be modeled by adding a PresentationStates field to each PresentationTemplate object, the field containing a collection of PresentationStateID's instead of a single value. For an SQL implementation, data stores are also created for ViewerStatesToEntityStates, ViewerStatesToDataStates, and ViewerStatesToPresentationStates to model many-to-many relationships. An example of these data stores and relationships is shown in FIG. 8. Additional necessary modifications are shown in FIG. 9.

Likewise, the invention could be implemented using related information files using the XML standard or other data tagging schemes. Files or collections of files could be created to represent each data store in the system. For example, an XML file for each entity could be created containing all entity data related to that entity, with each data element being tagged differently to later allow selection according to data states specified by a viewer's Viewer State. In this implementation, XML files could be stored either as individual files on a server, or inside an XML-enabled database. Other data stores could be implemented in files or in databases as dictated by design requirements. Templates could be created as media-specific template files, or as XSL template files that work with specifically with XML data. As with SQL database and object database implementations, the essence of the invention relates to the techniques used to select, customize, and rank entities, entity data, and presentation templates so that both content and visual design of each presentation are customized to a particular viewer state. Specific means of physically storing and retrieving information related to this process are beyond the scope of this invention.

FIG. 11 is a flow diagram of exemplary data display steps in accordance with the present invention. FIG. 12 is a flow diagram of exemplary data search steps in accordance with the present invention. FIG. 13 is an exemplary document produced using the template of FIG. 6. FIG. 14 is an exemplary document having data elements common to the exemplary document of FIG. 13, but using a customized template and different data elements suitable for a German viewer. FIG. 15 is an exemplary document having data elements common to the exemplary document of FIG. 13, but using a customized template and different data elements suitable for the biohazard industry.

Accordingly, the foregoing description is by way of example only, and not limiting. The invention is limited only as defined in the following claims and equivalents thereto.

What is claimed is:

1. A computer-implemented method for viewer-specific presentation of information, the method using a computer comprising a CPU, a memory operatively connected to the CPU, and a program stored in the memory and executable by the CPU for presenting information, the method comprising:

establishing a database of metadata defining a predetermined plurality of viewer states, at least one data state corresponding to each of said plurality of viewer states, a plurality of data types, and a plurality of data elements, each of said data elements being tagged for association with at least one of said data types and one of said data states;

receiving a request for information from a viewer;

identifying a respective viewer state associated with said viewer, said respective viewer state being one of said plurality of viewer states;

referencing said database to identify a collection of one or more data states related to said viewer state;

referencing said database to identify a collection of multiple data types relating to the request for information;

referencing said database to identify a data element data store storing multiple data elements, each of said multiple data elements being tagged for association with one of said data states and one of said data types;

selecting viewer-specific data elements from said data store by determining a corresponding data state of each data element in said data store, examining data elements related to each data type, and for each data type selecting a corresponding data element having a corresponding data state that is preferred among said data states corresponding to said viewer state;

presenting said viewer-specific data elements to said viewer to satisfy said viewer's request for information.

2. The method of claim 1, wherein said viewer state provides a list of data states in a ranked order of preference for satisfying a request for information for said viewer state.

3. The method of claim 2, wherein said corresponding data element comprises a respective data element having a respective data state that is most highly ranked among all data states corresponding to said viewer state.

4. The method of claim 3, further comprising:

identifying an entity data store storing a plurality of entities;

tagging each of said data elements in said data element data store with one of said entities;

selecting entity-specific data elements for each entity by examining said data elements and selecting a subset of said data elements corresponding to said entity;

selecting viewer-specific data elements from said entity-specific data elements by examining said entity-specific data elements corresponding to each data type, and for each data type selecting a corresponding data element having a corresponding data state that is preferred among said data states corresponding to said viewer state; and presenting said viewer-specific data elements selected from said entity-specific data elements for each entity to said viewer to satisfy said viewer's request for information.

5. The method of claim 4, wherein said corresponding data element comprises a respective data element having a respective data state that is most highly ranked among all data states corresponding to said viewer state.

6. The method of claim 5, further comprising:

identifying a set of entity types;

tagging each of said entities in said entity data store with one of said entity types;

identifying a collection of design states corresponding to said viewer state;

identifying a design template data store storing at least one design template describing a format for data presentation, each template being tagged with one of said design states and one of said entity types;

selecting viewer-specific design templates from said design template data store by determining a corresponding entity type for each entity in said entity data store, examining said design templates corresponding to said entity type, and selecting a corresponding design template having a corresponding design state that is preferred among said design states corresponding to said viewer state; and utilizing said viewer-specific design template to present said viewer-specific data elements selected from said entity-specific data elements for each entity to said viewer to satisfy said viewer's request for information.

7. The method of claim 6, wherein said viewer state provides a list of design states in a ranked order of preference for satisfying a request for information for said viewer state.

8. The method of claim 7, wherein said corresponding design state comprises a respective design state that is most highly ranked among all design states corresponding to said viewer state.

9. The method of claim 8, further comprising:

identifying a collection of entity states corresponding to said viewer state, said entity states being identified in a ranked order of preference for satisfying a request for information for said viewer state;

identifying an entity data store storing at least one entity, each entity being tagged with one of said entity types;

selecting viewer-specific entities from said entity data store by examining said entities and selecting entities having at least one entity state corresponding to said viewer state;

ranking said viewer-specific entities according to a highest ranked entity state for each entity specified by said ranked entity states corresponding to said viewer state; and utilitizing said viewer-specific design templates to present said viewer-specific data elements selected from said entity specific data elements for each of said selected entities to said viewer to satisfy said viewer's request for information.

10. The method of claim 6, wherein said corresponding design template comprises a respective design template having a respective design state that is most highly ranked among all design states corresponding to said viewer state.

11. The method of claim 5, further comprising:

identifying a collection of entity states corresponding to said viewer state, said entity states being identified in a ranked order of preference for satisfying a request for information for said viewer state;

identifying an entity data store containing at least one entity, each entity being tagged with at least one of said entity states;

selecting viewer-specific entities from said entity data store by examining said entities and selecting entities having at least one entity state corresponding to said viewer state;

ranking said viewer-specific entities according to a highest ranked entity state for each entity specified by said ranked entity states corresponding to said viewer state; and presenting said selected viewer-specific entities to said viewer to satisfy said viewer's request for information.

12. A computer-implemented method for viewer-specific presentation of information, the method using a computer comprising a CPU, a memory operatively connected to the CPU, and a program stored in the memory and executable by the CPU for presenting information, the method comprising:

establishing a database of metadata defining a predetermined plurality of viewer states, at least one design state corresponding to each of said plurality of viewer states, a plurality of entity types, and a plurality of entities, each of said entities being tagged for association with at least one of said entity types;

receiving a request for information from a viewer;

identifying a respective viewer state associated with said viewer said respective viewer state being one of said plurality of viewer states;

referencing said database to identify a collection of design states corresponding to said viewer state;

referencing said database to identify a set of entity types;

referencing said database to identify an entity data store storing at least one entity, each entity being tagged with one of said entity types;

referencing said database to identify a design template data store storing at least one design template describing a format for a data presentation, each template being tagged with one of said design states and one of said entity types;

selecting a viewer-specific design template from said design template data store by determining a corresponding entity type of each entity in said entity data store, examining said design templates corresponding to said entity type, and selecting a corresponding design template having a corresponding design state that is preferred among said design states corresponding to said viewer state; and utilitizing said viewer-specific design template to present said entities to said viewer to satisfy said viewer's request for information.

13. The method of claim 12, wherein said design states are identified in a ranked order of preference for satisfying a request for information for said viewer state.

14. The method of claim 13, wherein said corresponding design template comprises a respective design template having a respective design state that is most highly ranked among all design states corresponding to said viewer state.

15. The method of claim 14, further comprising:

identifying a collection of entity states corresponding to said viewer state, said entity states being identified in a ranked order of preference for satisfying a request for information for said viewer state;

identifying an entity data store storing at least one entity, each entity being tagged with one of said entity types;

selecting viewer-specific entities from said entity data store by examining all entities and selecting entities having at least one entity state corresponding to said viewer state;

ranking said viewer-specific entities according to a highest ranked entity state for each entity specified by said ranked entity states corresponding to said viewer state;

selecting a viewer-specific design template from said design template data store by determining a corresponding entity type of each selected entity in said entity data store, examining said design templates corresponding to said entity type, and selecting a corresponding design template having a corresponding design state that is preferred among said design states corresponding to said viewer state; and utilitizing said viewer-specific design template to present said selected entities to said viewer to satisfy said viewer's request for information.

16. The method of claim 15, wherein said corresponding design state comprises a respective design state that is most highly ranked among all design states corresponding to said viewer state.

17. A computer-implemented method for viewer-specific presentation of information, the method using a computer comprising a CPU, a memory operatively connected to the CPU, and a program stored in the memory and executable by the CPU for presenting information, the method comprising:

establishing a database of metadata defining a predetermined plurality of viewer states, at least one entity state corresponding to each of said plurality of viewer states, and a plurality of entities;

receiving a request for information from a viewer;

identifying a viewer state associated with said viewer;

identifying a collection of entity states corresponding to said viewer state, said entity states being identified in a ranked order of preference for satisfying a request for information for said viewer state;

identifying an entity data store containing at least one entity, each entity being tagged with at least one of said entity states;

selecting viewer-specific entities from said entity data store by examining said entities and selecting entities having at least one entity state corresponding to said viewer state;

ranking said viewer-specific entities according to a highest ranked entity state for each entity specified by said ranked entity states corresponding to said viewer state; and presenting said ranked entities to said viewer to satisfy said viewer's request for information.

* * * * *